(12) United States Patent
Lim

(10) Patent No.: US 12,523,699 B2
(45) Date of Patent: Jan. 13, 2026

(54) APPARATUS AND METHOD FOR DIAGNOSING STATE OF BATTERY

(71) Applicant: LG ENERGY SOLUTION, LTD., Seoul (KR)

(72) Inventor: Bo-Mi Lim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 458 days.

(21) Appl. No.: 18/018,754

(22) PCT Filed: Oct. 5, 2021

(86) PCT No.: PCT/KR2021/013633
§ 371 (c)(1),
(2) Date: Jan. 30, 2023

(87) PCT Pub. No.: WO2022/075708
PCT Pub. Date: Apr. 14, 2022

(65) Prior Publication Data
US 2023/0305065 A1    Sep. 28, 2023

(30) Foreign Application Priority Data
Oct. 5, 2020  (KR) .................. 10-2020-0128194

(51) Int. Cl.
*G01R 31/367*  (2019.01)

(52) U.S. Cl.
CPC .................. *G01R 31/367* (2019.01)

(58) Field of Classification Search
None
See application file for complete search history.

(56) References Cited

U.S. PATENT DOCUMENTS

| | | |
|---|---|---|
| 2008/0050620 A1 | 2/2008 | Frost et al. |
| 2013/0069660 A1 | 3/2013 | Bernard et al. |
| 2016/0018472 A1 | 1/2016 | Sung et al. |

(Continued)

FOREIGN PATENT DOCUMENTS

| | | |
|---|---|---|
| CN | 106597311 A | 4/2017 |
| CN | 107643495 A | 1/2018 |

(Continued)

OTHER PUBLICATIONS

International Search Report for PCT/KR2021/013633 mailed on Jan. 24, 2022.

(Continued)

*Primary Examiner* — Raymond L Nimox
(74) *Attorney, Agent, or Firm* — Birch, Stewart, Kolasch & Birch, LLP

(57) ABSTRACT

An apparatus for diagnosing a state of a battery which may trace and diagnose a state of the battery based on various feature values of the battery. The state of the battery may be periodically diagnosed to prevent an accident caused by a battery defect in advance. In addition, the state of the battery may be tracked and diagnosed based on the profile of the battery obtained at every predetermined cycle. That is, since a time point when the state of the battery is diagnosed as an abnormal state and the state of the battery at the time may be specified and stored, specific diagnostic information about the state of the battery may be provided.

18 Claims, 4 Drawing Sheets

(56) References Cited

U.S. PATENT DOCUMENTS

| | | | |
|---|---|---|---|
| 2016/0231386 A1* | 8/2016 | Sung | G01R 31/382 |
| 2016/0239759 A1 | 8/2016 | Sung | |
| 2017/0229891 A1 | 8/2017 | Lee et al. | |
| 2019/0033376 A1 | 1/2019 | Jeong et al. | |
| 2020/0366115 A1 | 11/2020 | Kim et al. | |
| 2020/0408846 A1 | 12/2020 | Bae et al. | |
| 2021/0041506 A1 | 2/2021 | Bae et al. | |
| 2021/0046844 A1 | 2/2021 | Bae et al. | |
| 2022/0082625 A1* | 3/2022 | Kurisawa | G06N 3/08 |
| 2022/0367924 A1* | 11/2022 | Kurisawa | G06Q 10/20 |
| 2023/0184837 A1 | 6/2023 | Lee | |
| 2023/0273262 A1 | 8/2023 | Lim | |

FOREIGN PATENT DOCUMENTS

| | | |
|---|---|---|
| CN | 109063260 A | 12/2018 |
| CN | 111103544 A | 5/2020 |
| CN | 111200168 A | 5/2020 |
| EP | 3 680 676 A1 | 7/2020 |
| JP | 2006-118928 A | 5/2006 |
| JP | 2008-78131 A | 4/2008 |
| JP | 2013-519893 A | 5/2013 |
| JP | 5765375 B2 | 8/2015 |
| JP | 2019-163948 A | 9/2019 |
| JP | 2020-8337 A | 1/2020 |
| JP | 2023-527806 A | 6/2023 |
| JP | 2023-534823 A | 8/2023 |
| KR | 10-2016-0010132 A | 1/2016 |
| KR | 10-2016-0097029 A | 8/2016 |
| KR | 10-2016-0101506 A | 8/2016 |
| KR | 10-1880195 B1 | 7/2018 |
| KR | 10-2019-0011957 A | 2/2019 |
| KR | 10-2019-0118534 A | 10/2019 |
| KR | 10-2019-0118536 A | 10/2019 |
| KR | 10-2020-0026128 A | 3/2020 |
| KR | 10-2020-0102923 A | 9/2020 |
| WO | WO 2020/097271 A1 | 5/2020 |

OTHER PUBLICATIONS

Extended European Search Report for European Application No. 21877959.3, dated Feb. 27, 2024.

Guo et al., "A data-driven remaining capacity estimation approach for lithium-ion batteries based on charging health feature extraction," Elsevier, vol. 412, Nov. 30, 2018, pp. 442-450.

Li et al., "State-of-health estimation of lithium-ion batteries based on semi-supervised transfer component analysis," Elsevier, vol. 277, Jul. 31, 2018, pp. 1-13.

Zhu et al., "HMM-Driven Robust Probabilistic Principal Component Analyzer for Dynamic Process Fault Classification," IEEE Transactions on Industrial Electronics, vol. 62, No. 6, Jun. 2015, pp. 3814-3821.

* cited by examiner

| PRINCIPAL COMPONENT | DISTRIBUTION DEGREE(%) |
|---|---|
| FIRST PRINCIPAL COMPONENT(PC1) | 55 |
| SECOND PRINCIPAL COMPONENT(PC2) | 25 |
| THIRD PRINCIPAL COMPONENT(PC3) | 11 |
| FOURTH PRINCIPAL COMPONENT(PC4) | 6 |
| FIFTH PRINCIPAL COMPONENT(PC5) | 3 |

TARGET COMPONENT: PC1, PC2, PC3

APPARATUS AND METHOD FOR DIAGNOSING STATE OF BATTERY

TECHNICAL FIELD

The present application claims priority to Korean Patent Application No. 10-2020-0128194 filed on Oct. 5, 2020 in the Republic of Korea, the disclosures of which are incorporated herein by reference.

The present disclosure relates to an apparatus and method for diagnosing a state of a battery, and more particularly, to an apparatus and method for diagnosing a state of a battery, which may diagnose a state of a battery.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-discharging rate and high energy density.

Conventionally, battery information such as voltage, current and/or temperature of a battery is acquired, and the state of the battery is diagnosed based on the result of simply comparing the acquired battery information with a criterion voltage or criterion voltage range. For example, the state of the battery is diagnosed as a normal state, an over-voltage state, or an under-voltage state according to whether the voltage of the battery belongs to the criterion voltage range.

However, in reality, since a fire may occur even if the voltage, current and/or temperature of the battery falls within the criterion range, there is demanded a technique for accurately diagnosing the state of the battery from a statistical viewpoint by tracing changes in the battery profile, instead of diagnosing the state of the battery by simply comparing a feature value (e.g., a voltage value) with a reference value (e.g., a criterion voltage or criterion voltage range).

DISCLOSURE

Technical Problem

The present disclosure is designed to solve the problems of the related art, and therefore the present disclosure is directed to providing an apparatus and method for diagnosing a state of a battery, which may trace and diagnose a state of a battery based on various feature values of the battery.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A diagnosing apparatus according to an aspect of the present disclosure may comprise: a profile generating unit configured to obtain battery information including at least one of voltage, capacity, internal resistance, state of charge (SOC), and state of health (SOH) of each of a plurality of batteries and generate a plurality of battery profiles based on the obtained battery information for each of the plurality of batteries at each of a plurality of cycles; a feature value extracting unit configured to extract a plurality of feature values for each of the plurality of batteries by using the battery information and the plurality of battery profiles generated by the profile generating unit; a principal component calculating unit configured to calculate a plurality of principal components for the plurality of feature values extracted by the feature value extracting unit; a battery classifying unit configured to calculate a distribution degree for each principal component representing distribution of the plurality of batteries for the plurality of principal components based on the plurality of feature values extracted for each of the plurality of batteries, select at least one of the plurality of principal components as a target component according to a result of comparing the calculated distribution degree for each principal component with a preset criterion value, and classify each of the plurality of batteries into any one of a plurality of groups based on the selected at least one target component; and a battery state diagnosing unit configured to update a classification history for the group into which each of the plurality of batteries is classified by the battery classifying unit at each of a plurality of cycles and diagnose a state of each of the plurality of batteries based on the updated classification history.

The battery classifying unit may be configured to classify a reference cell set to correspond to an abnormal cell into any one of the plurality of groups based on the selected at least one target component.

The battery state diagnosing unit may be configured to set a group to which the reference cell belongs among the plurality of groups as an abnormal group and set a remaining group as a normal group.

The classification history may be provided to each of the plurality of batteries and may be configured to include a group classified in a previous cycle, a group classified in a current cycle, a changing frequency to the abnormal group, and a changing frequency to the normal group.

The battery state diagnosing unit may be configured to determine a target battery in which the group classified in the previous cycle is different from the group classified in the current cycle among the plurality of batteries, and diagnose the state of the target battery as a normal state or an abnormal state based on the changing frequency to the abnormal group or the changing frequency to the normal group for the determined target battery.

The battery state diagnosing unit may be configured to diagnose the state of the target battery as an abnormal state when the changing frequency to the abnormal group is equal to or greater than a predetermined frequency, in the case where the target battery is classified into the abnormal group at the current cycle.

The battery state diagnosing unit may be configured to diagnose the state of the target battery as a normal state when the changing frequency to the normal group is equal to or greater than the predetermined frequency, in the case where the target battery is classified into the normal group at the current cycle.

The battery classifying unit may be configured to select at least one of the plurality of principal components, and select the selected at least one principal component as the target component when a sum of distribution degrees for each principal component corresponding to the selected at least one principal component is equal to or greater than the preset criterion value.

The battery classifying unit may be configured to calculate the sum by adding the distribution degree for each principal component corresponding to each of the plurality of principal components in order from a greater one, until the sum becomes equal to or greater than the preset criterion value.

The battery classifying unit may be configured to generate a representative model that classifies the plurality of batteries and the reference cell into the plurality of groups, at each of a plurality of cycles.

The battery classifying unit may be configured to generate a target set including the selected at least one target component, generate a plurality of target subsets including at least one target component in the generated target set, generate at least one classification model for classifying the plurality of batteries and the reference cell for each of the plurality of target subsets, and set any one of the plurality of classification models generated for the plurality of target subsets as a representative model for the corresponding cycle.

The battery classifying unit may be configured to calculate a classification degree of the plurality of batteries and the reference cell for each of the plurality of generated classification models, and set a classification model having the smallest calculated classification degree among the plurality of generated classification models as the representative model for the corresponding cycle.

The battery classifying unit may be configured to calculate an inner product of the plurality of batteries and the reference cell for at least one target component included in each of the plurality of target subsets, and generate the plurality of classification models for classifying the plurality of batteries and the reference cell according to the size of the plurality of calculated inner products.

The battery classifying unit may be configured to control each of the plurality of classification models so that the total number of classified groups is equal to or smaller than a preset criterion number.

A battery pack according to another aspect of the present disclosure may comprise the apparatus for diagnosing a state of a battery according to an aspect of the present disclosure.

An energy storage system according to still another aspect of the present disclosure may comprise the apparatus for diagnosing a state of a battery according to an aspect of the present disclosure.

A method for diagnosing a state of a battery according to still another aspect of the present disclosure may comprise: a profile generating step of generating a battery profile representing a corresponding relationship between voltage and capacity of each of a plurality of batteries at each of a plurality of cycles for each of the plurality of batteries; a feature value extracting step of extracting a plurality of feature values in each of the plurality of battery profiles generated in the profile generating step; a principal component calculating step of calculating a plurality of principal components for the plurality of feature values extracted in the feature value extracting step; a principal component distribution degree calculating step of calculating a distribution degree for each principal component representing distribution of the plurality of batteries for the plurality of principal components based on the plurality of feature values extracted for each of the plurality of batteries; a target component selecting step of selecting at least one of the plurality of principal components as a target component according to a result of comparing the distribution degree for each principal component calculated in the principal component distribution degree calculating step with a preset criterion value; a battery classifying step of classifying each of the plurality of batteries into any one of a plurality of groups based on the at least one target component selected in the target component selecting step; and a battery state diagnosing step of updating a classification history for the group into which each of the plurality of batteries is classified in the battery classifying step at each of a plurality of cycles and diagnosing a state of each of the plurality of batteries based on the updated classification history.

Advantageous Effects

According to an aspect of the present disclosure, the state of the battery may be periodically diagnosed to prevent an accident caused by a battery defect in advance.

In addition, according to one aspect of the present disclosure, the state of the battery may be tracked and diagnosed based on the profile of the battery obtained at every predetermined cycle. That is, since a time point when the state of the battery is diagnosed as an abnormal state and the state of the battery at the time may be specified and stored, specific diagnostic information about the state of the battery may be provided.

The effects of the present disclosure are not limited to the above, and other effects not mentioned herein will be clearly understood by those skilled in the art from the appended claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, a preferred embodiment of the present disclosure will be described in detail with reference to the accompanying drawings.

Figure 1:
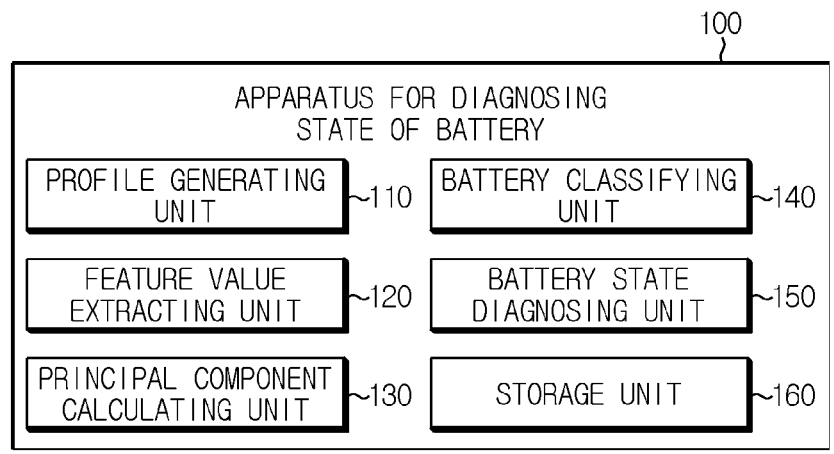
FIG. 1 is a diagram schematically showing an apparatus for diagnosing a state of a battery according to an embodiment of the present disclosure.

FIG. 1 is a diagram schematically showing an apparatus 100 for diagnosing a state of a battery according to an embodiment of the present disclosure.

Referring to FIG. 1, the apparatus 100 for diagnosing a state of a battery according to an embodiment of the present disclosure may include a profile generating unit 110, a feature value extracting unit 120, a principal component calculating unit 130, a battery classifying unit 140, and a battery state diagnosing unit 150.

Here, the battery refers to one physically separable independent cell having a negative electrode terminal and a positive electrode terminal. For example, one pouch-type lithium polymer cell may be regarded as one battery.

The profile generating unit 110 may be configured to obtain battery information including at least one of voltage, capacity, internal resistance, SOC (State Of Charge), and SOH (State Of Health) of each of a plurality of batteries.

Specifically, the battery information obtained by the profile generating unit 110 may be information obtained in the process of charging the battery.

For example, the voltage and capacity of the battery may be measured while the battery is being charged. In addition, the SOC of the battery may be estimated based on the voltage of the battery and/or the charging current of the battery. In addition, the internal resistance of the battery may be estimated based on the voltage and SOC of the battery. For example, the internal resistance of the battery may be estimated from the voltage and SOC of the battery based on an EKF (Extended Kalman Filter) and an ECM (Equivalent Circuit Model) for the battery. In addition, the SOH of the battery may be estimated based on the estimated SOC of the battery.

In addition, the profile generating unit 110 may be configured to generate a plurality of battery profiles for each of the plurality of batteries for every cycle based on the obtained battery information.

Here, the cycle may be set to a predetermined time interval. The settings for the cycle may be changed. The cycle may also be changed temporarily. For example, the cycle may be set to have a first time interval by default. If a specific event occurs before an $n+1^{th}$ cycle according to the first time interval arrives from an $n^{th}$ cycle, the profile generating unit 110 may obtain battery information and a plurality of battery profiles. In addition, if the $n^{th}$ cycle arrives, the profile generating unit 110 may obtain battery information and a plurality of battery profiles. Here, the specific event may be a case in which a battery state diagnosis request is input to the apparatus 100 for diagnosing a state of a battery from the outside.

The profile generating unit 110 may generate a voltage-SOC profile representing a corresponding relationship between the voltage (V) of the battery and the SOC of the battery and a voltage-capacity profile indicating a corresponding relationship between the voltage (V) and capacity (Q) of the battery.

In addition, the profile generating unit 110 may generate a differential voltage profile representing a corresponding relationship between the charging time (t) of the battery and the differential voltage (dV/dt). Here, the differential voltage may be a value obtained by differentiating the voltage value [V] of the battery with respect to the charging time value [sec].

In addition, the profile generating unit 110 may generate a voltage-differential capacity profile representing a corresponding relationship between the voltage (V) of the battery and the differential capacity (dQ/dV). Here, the differential capacity may be a value obtained by differentiating the battery capacity value [mAh] with respect to the voltage value [V] of the battery.

The profile generating unit 110 may generate at least one of a voltage-SOC profile, a differential voltage profile, a voltage-capacity profile, and a voltage-differential capacity profile as a battery profile for each of the plurality of batteries.

Figure 2:
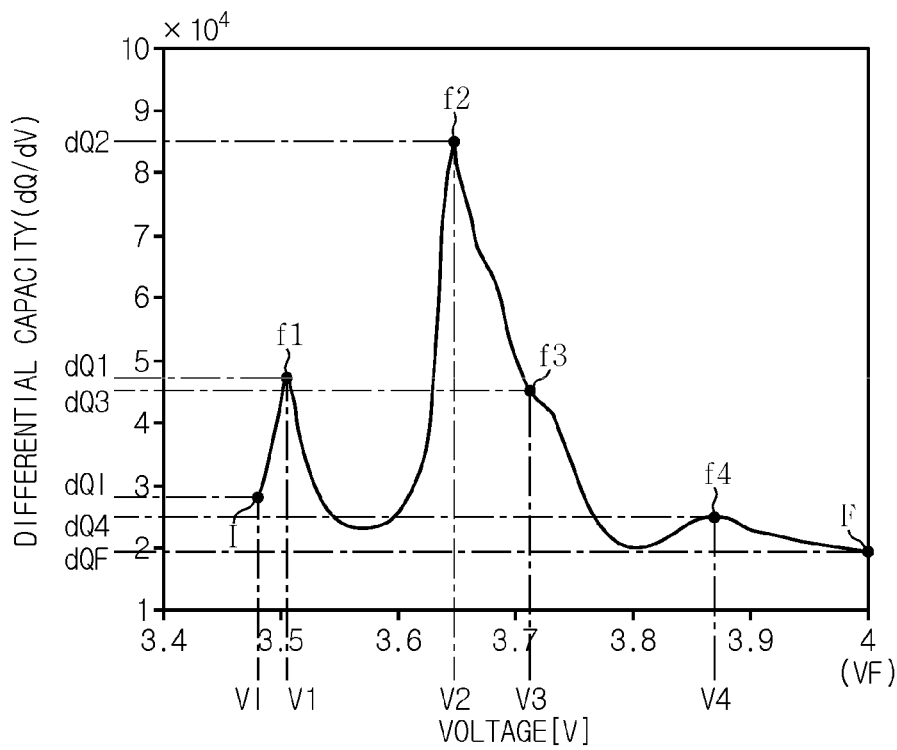
FIG. 2 is a diagram schematically showing a voltage-differential capacity profile among battery profiles generated by the apparatus for diagnosing a state of a battery according to an embodiment of the present disclosure.

FIG. 2 is a diagram schematically showing a voltage-differential capacity profile among battery profiles generated by the apparatus 100 for diagnosing a state of a battery according to an embodiment of the present disclosure.

Referring to FIG. 2, the profile generating unit 110 may generate a voltage-differential capacity profile for the voltage and differential capacity of the battery based on a voltage value and a capacity value obtained while the battery is being charged.

The feature value extracting unit 120 may be configured to extract a plurality of feature values for each of the plurality of batteries by using the battery information and the plurality of battery profiles generated by the profile generating unit 110.

For example, in the embodiment of FIG. 2, the feature value extracting unit 120 may determine a charging start point I, a first feature f1, a second feature f2, a third feature f3, a fourth feature f4 and a charging end point F in the voltage-differential capacity profile generated by the profile generating unit 110.

Here, the first feature f1, the second feature f2, and the fourth feature f4 may be points at which an instantaneous change rate of the differential capacity with respect to voltage is 0. Preferably, the instantaneous change rate of the differential capacity with respect to voltage based on each of the first feature f1, the second feature f2, and the fourth feature f4 may change from a positive value to a negative value. For example, in the embodiment of FIG. 2, the voltage value of the first feature f1 selected by the feature value extracting unit 120 may be V1, and the differential capacity value may be dQ1. In addition, the voltage value of the second feature f2 may be V2, and the differential capacity value may be dQ2. In addition, the voltage value of the fourth feature f4 may be V4, and the differential capacity value may be dQ4.

In addition, the third feature f3 may be a point at which the voltage value (V3) is located between the voltage value (V2) of the second feature f2 and the voltage value (V4) of the fourth feature f4 and the instantaneous change rate of the differential capacity with respect to voltage changes by a predetermined size or more based on the third feature f3. Specifically, the third feature f3 is related to the degradation of the positive electrode of the battery, and may appear in a voltage region between the second feature f2 and the fourth feature f4.

The feature value extracting unit 120 may extract various factors that can be obtained in the voltage-differential capacity profile, such as the voltage value of the charging start point I, the voltage value and the differential capacity value of the first to fourth features f1, f2, f3, f4, the voltage value of the charging end point F, the average change amount of the differential capacity for the voltage between the charging start point I and each feature f1, f2, f3, f4, and the area of the differential capacity for the voltage between the charging start point I and each feature f1, f2, f3, f4, as feature values of the battery in the voltage-differential capacity profile.

For example, in the embodiment of FIG. 2, the voltage value of the charging start point I may be VI, and the voltage value of the charging end point F may be VF. In addition, the differential capacity value of the charging start point I may be dQI, and the differential capacity value of the charging end point F may be dQF.

For example, the average change amount of the differential capacity for the voltage between the charging start point I and the first feature f1 may be calculated by the formula "(dQ1−dQI)÷(V1−VI)". In addition, the area of the differential capacity with respect to the voltage between the charging start point I and the first feature f1 may be calculated according to the area from VI to V1 based on dQI. In a similar way, various feature values of the battery may be extracted in the voltage-differential capacity profile.

In addition, the feature value extracting unit 120 may extract the SOC of the charging start point I and the SOC of the charging end point F from the voltage-SOC profile generated by the profile generating unit 110. That is, the feature value extracting unit 120 may further extract a lowest SOC (SOC of the charging start point I) and a highest SOC (SOC of the charging end point F) of the battery as feature values.

In addition, the feature value extracting unit 120 may further extract a minimum differential voltage value, a maximum differential voltage value, and an average differential voltage value in the differential voltage profile generated by the profile generating unit 110 as feature values.

In addition, the feature value extracting unit 120 may further extract the SOH and internal resistance value [Ω] of the battery from the battery information as a feature value.

The principal component calculating unit 130 may be configured to calculate a plurality of principal components for the plurality of feature values extracted by the feature value extracting unit 120.

Specifically, the principal component calculating unit 130 may calculate a plurality of principal components based on the dispersion of the plurality of feature values extracted for each of the plurality of batteries by using a principal component analysis method. That is, here, the principal component may mean a unique vector for the plurality of extracted feature values.

For example, it is assumed that the feature value extracting unit 120 extracts an N number of feature values for each of the plurality of batteries. The principal component calculating unit 130 may calculate an N number of principal components from an N number of feature values by using a principal component analysis method. That is, a first principal component PC1 to an $n^{th}$ principal component (PCNs) may be calculated by the principal component calculating unit 130.

As a more specific example, it is assumed that the feature values of the first battery are a1, b1, and c1, the feature values of the second battery are a2, b2, and c2, and the feature values of the third battery are a3, b3, and c3. Referring to the Euclidean coordinate system, the feature value of the first battery may be expressed as (a1, b1, c1), the feature value of the second battery may be expressed as (a2, b2, c2), and the feature value of the third battery may be expressed as (a3, b3, c3). The principal component calculating unit 130 may calculate the first principal component PC1, the second principal component PC2, and the third principal component PC3 for (a1, b1, c1), (a2, b2, c2), and (a3, b3, c3).

The battery classifying unit 140 may be configured to calculate a distribution degree for each principal component representing the distribution of the plurality of batteries for the plurality of principal components based on the plurality of feature values extracted for each of the plurality of batteries.

First, the battery classifying unit 140 may calculate a distribution value of the plurality of batteries for each of the plurality of principal components by projecting the plurality of feature values of each of the plurality of batteries to each of the plurality of principal components.

For example, as in the previous embodiment, it is assumed that three feature values are extracted for the first battery, the second battery, and the third battery by the feature value extracting unit 120, and the first principal component PC1, the second principal component PC2, and the third principal component PC3 are calculated by the principal component calculating unit 130. The battery classifying unit 140 may calculate distribution values of the first to third batteries for the first principal component PC1 by projecting the feature values of the first to third batteries to the first principal component PC1. That is, the battery classifying unit 140 may project (a1, b1, c1), (a2, b2, c2), and (a3, b3, c3) to the first principal component PC1. For example, it is assumed that the feature value of the first battery projected to the first principal component PC1 is (a1', b1', c1'), and the feature value of the second battery projected thereto is (a2', b2', c2'), and the feature value of the third battery projected thereto is (a3', b3', c3'). The battery classifying unit 140 may calculate a maximum distance among the distance between (a1', b1', c1') and (a2', b2', c2'), the distance between (a1', b1', c1') and (a3', b3', c3'), and the distances between (a2', b2', c2') and (a3', b3', c3') as distribution values of the first to third batteries for the first principal component PC1. In this way, the battery classifying unit 140 may calculate distribution values of the first to third batteries for the second principal component PC2 and distribution values of the first to third batteries for the third principal component PC3.

In addition, the battery classifying unit 140 may calculate a distribution degree for each principal component for each of the plurality of principal components based on the distribution value calculated for each of the plurality of principal components. Specifically, the battery classifying unit 140 may calculate a distribution degree for each principal component using Equation 1 below.

$$PCjv = \frac{\max(\text{Var}(PCj))}{\sum_{i=1}^{n} \max(\text{Var}(PCi))} \quad \text{[Equation 1]}$$

In Equation 1, n is the number of principal components calculated by the principal component calculating unit 130, and is a natural number. PCi refers to an $i^{th}$ principal component, and PCj refers to a $j^{th}$ principal component. For example, PC1 refers to the first principal component PC1, PC2 refers to the second principal component PC2, and PCn refers to the $n^{th}$ principal component PCn. That is, i and j are temporary variables for specifying the corresponding principal component, and j is a natural number between 1 and n.

Also, in Equation 1, PCjv is a distribution degree for each principal component. For example, PC1v is the distribution degree of the first principal component PC1, PC2v is the distribution degree of the second principal component PC2, and PCnv is the distribution degree of the $n^{th}$ principal component PCn.

Also, in Equation 1, Var(PCi) refers to a set of distances between the feature values of the plurality of batteries projected to the $i^{th}$ principal component. In addition, max{Var(PCi)} is a distribution value of the $i^{th}$ principal component. That is, max{Var(PCi)} represents a maximum distance among distances between the feature values of the plurality of batteries projected to the $i^{th}$ principal component.

Figures 3, 4:
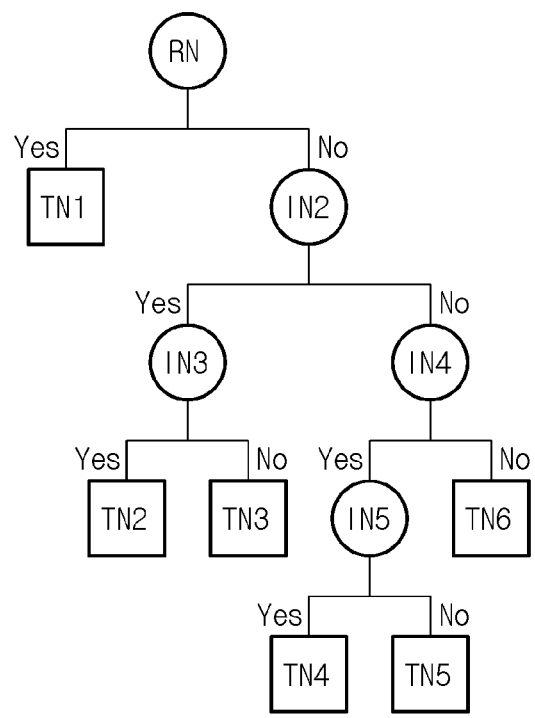
FIG. 3 is a diagram schematically showing an example of a distribution degree for each principal component calculated by the apparatus for diagnosing a state of a battery according to an embodiment of the present disclosure.
FIGS. 4 and 5 are diagrams schematically showing a classification model generated at a current cycle by the apparatus for diagnosing a state of a battery according to an embodiment of the present disclosure.

FIG. 3 is a diagram schematically showing an example of a distribution degree for each principal component calculated by the apparatus 100 for diagnosing a state of a battery according to an embodiment of the present disclosure.

Referring to FIG. 3, the first principal component PC1, the second principal component PC2, the third principal component PC3, the fourth principal component PC4, and the fifth principal component PC5 may be calculated by the principal component calculating unit 130. Here, the distribution degree of the first principal component PC1 is 55%, the distribution degree of the second principal component PC2 is 25%, the distribution degree of the third principal component PC3 is 11%, the distribution degree of the fourth principal component PC4 is 6%, and the distribution degree of the fifth principal component PC5 is 3%.

The battery classifying unit 140 may be configured to select at least one of the plurality of principal components as a target component according to a result of comparing the calculated distribution degree for each principal component with a preset criterion value.

Preferably, the battery classifying unit 140 may be configured to select at least one of the plurality of principal components, and select the selected at least one principal component as the target component when the sum of the distribution degree for each principal component corresponding to the selected at least one principal component is equal to or greater than the preset criterion value.

More specifically, the battery classifying unit 140 may be configured to calculate the sum by adding the distribution degree for each principal component corresponding to each of the plurality of principal components in order from a greater one until the sum becomes equal to or greater than the preset criterion value.

For example, in the embodiment of FIG. 3, it is assumed that the criterion value is preset to 90%. The battery classifying unit 140 may first select the first principal component PC1, and compare the distribution degree (55%) of the first principal component PC1 with the criterion value (90%). Since the distribution degree (55%) of the first principal component PC1 is smaller than the criterion value (90%), the battery classifying unit 140 may select the second principal component PC2 and calculate the sum of the distribution degrees of the first and second principal component PC1 and PC2 as 80%. Since the sum (80%) of the distribution degrees of the first and second principal components PC1 and PC2 is also smaller than the criterion value (90%), the battery classifying unit 140 may select the third principal component PC3 and calculate the sum of the distribution degrees of the first to third principal component PC1 to PC3 as 91%. Since the sum (91%) of the distribution degrees of the first to third principal components PC1 to PC3 is greater than the criterion value (90%), the battery classifying unit 140 may select the first principal component PC1, the second principal component PC2, and the third principal component PC3 as target components.

Also, the battery classifying unit 140 may be configured to classify each of the plurality of batteries into one of a plurality of groups based on the selected at least one target component. That is, the target component is selected to classify the plurality of batteries, and may be a part or all of the plurality of principal components.

Specifically, the battery classifying unit 140 may be configured to classify a reference cell set to correspond to an abnormal cell and the plurality of batteries into one of the plurality of groups, based on the selected at least one target component.

For example, the reference cell is a battery of the same type as the plurality of batteries, and may be a degenerated cell in an EOL (End of Life) state. The battery classifying unit 140 may classify the plurality of batteries and the reference cell into one of the plurality of groups based on the selected at least one target component.

The battery state diagnosing unit 150 may be configured to update the classification history for the group into which each of the plurality of batteries is classified by the battery classifying unit 140 at every cycle.

Preferably, the battery classifying unit 140 may be configured to classify the reference cell set to correspond to an abnormal cell into one of the plurality of groups, based on the selected at least one target component. In addition, the battery state diagnosing unit 150 may be configured to set a group to which the reference cell belongs among the plurality of groups as an abnormal group and set the remaining group as a normal group.

That is, the group into which the reference cell is classified among the plurality of groups may be set as an abnormal group, and the remaining group excluding the abnormal group among the plurality of groups may be set as a normal group.

In addition, the classification history may be provided for each of the plurality of batteries. That is, the classification history may be provided for each of the plurality of batteries. In addition, the classification history may be configured to include a group classified in a previous cycle, a group classified in a current cycle, a changing frequency to the abnormal group, and a changing frequency to the normal group.

For example, the battery state diagnosing unit 150 may update the classification history of each of the plurality of batteries at every cycle. The updated classification history may include a group classified in the previous cycle and a group classified in the current cycle. In addition, according to the group classification result of the battery in the current cycle, the changing frequency to the abnormal group or the changing frequency to the normal group may be updated.

In addition, the battery state diagnosing unit 150 may be configured to diagnose the state of each of the plurality of batteries based on the updated classification history.

Specifically, the battery state diagnosing unit 150 may be configured to determine a target battery in which the group classified in the previous cycle is different from the group classified in the current cycle, among the plurality of batteries.

Here, the target battery means a battery in which the group classified in the previous cycle and the group classified in the current cycle are different. The target battery determined in the current cycle may not exist, or at least target battery may exist, depending on the classification result. For example, a battery classified as an abnormal group in the previous cycle but classified as a normal group in the current cycle may be determined as a target battery. Conversely, a battery classified as a normal group in the previous cycle but classified as an abnormal group in the current cycle may be determined as a target battery.

In addition, the battery state diagnosing unit 150 may be configured to diagnose the state of the target battery as a normal state or an abnormal state based on the changing frequency to the abnormal group or the changing frequency to the normal group for the determined target battery.

Here, the changing frequency to the abnormal group is the number of times classified as a normal group in the previous cycle but classified as an abnormal group in the current cycle. Conversely, the changing frequency to the normal group is the number of times classified as an abnormal group in the previous cycle but classified as a normal group in the current cycle. That is, in the case of the target battery, the changing frequency to the abnormal group or the changing frequency to the normal group may be updated according to the group classification result. For example, the changing frequency may be increased by one.

Preferably, when the target battery is classified as the abnormal group in the current cycle, the battery state diagnosing unit 150 may be configured to diagnose the state of the target battery as an abnormal state if the changing frequency to the abnormal group is equal to or greater than a predetermined frequency.

Conversely, when the target battery is classified as the normal group in the current cycle, the battery state diagnosing unit 150 may be configured to diagnose the state of the target battery as a normal state if the changing frequency to the normal group is equal to or greater than the predetermined frequency.

For example, the predetermined frequency may be preset to two or more. The battery state diagnosing unit 150 may diagnose the state of the battery as an abnormal state or a normal state when the battery is determined a target battery a plurality of times.

That is, the battery state diagnosing unit 150 does not determine the state of the battery based on the fact that the classification result of the battery is changed from abnormal to normal or from normal to abnormal just once, but may determine the state of the battery when the classification result of the battery is changed multiple times. Accordingly, the accuracy of determining the state of the battery by the battery state diagnosing unit 150 may be high.

Since the apparatus 100 for diagnosing a state of a battery according to an embodiment of the present disclosure diagnoses the state of each of the plurality of batteries based on the principal component analysis method and the battery classification, there is an advantage that the state of the battery may be diagnosed in consideration of various aspects. In addition, the apparatus 100 for diagnosing a state of a battery may increase the accuracy of diagnosing the state of the battery compared to the prior art in which the state of the battery is diagnosed by simply comparing the feature value of the battery with a predetermined reference value.

Meanwhile, a plurality of reference cells may be provided. In this case, each of the plurality of reference cells may be configured to be degraded due to different causes.

For example, the first reference cell may be configured to be degraded due to loss of a positive electrode reaction area, and the second reference cell may be configured to be degraded due to loss of available lithium. In addition, the third reference cell may be configured to be degraded due to loss of a negative electrode reaction area.

In this case, the state of the battery classified into the same group as each reference cell may be diagnosed in more detail.

For example, referring to the previous embodiment, the state of the battery classified into the same group as the first reference cell may be diagnosed as a state in which the positive electrode reaction area is lost. In addition, the state of the battery classified into the same group as the second reference cell may be diagnosed as a state in which available lithium is lost. In addition, the state of the battery classified into the same group as the third reference cell may be diagnosed as a state in which the negative electrode reaction area is lost.

Since the apparatus 100 for diagnosing a state of a battery according to an embodiment of the present disclosure includes a plurality of reference cells configured to be degraded due to various causes, and there is an advantage of more specifically diagnosing the states of the plurality of batteries.

For example, each of the profile generating unit 110, the feature value extracting unit 120, the principal component calculating unit 130, the battery classifying unit 140, and the battery state diagnosing unit 150 included in the apparatus 100 for diagnosing a state of a battery according to an embodiment of the present disclosure may be configured as a processor known in the art.

As another example, the profile generating unit 110, the feature value extracting unit 120, the principal component calculating unit 130, the battery classifying unit 140, and the battery state diagnosing unit 150 included the apparatus 100 for diagnosing a state of a battery may be provided in one processor. That is, the profile generating unit 110, the feature value extracting unit 120, the principal component calculating unit 130, the battery classifying unit 140, and the battery state diagnosing unit 150 may be divided into functional components of one processor. Alternatively, each of the profile generating unit 110, the feature value extracting unit 120, the principal component calculating unit 130, the battery classifying unit 140, and the battery state diagnosing unit 150 may be implemented as a unit core provided in one processor.

In addition, the processor may optionally include an application-specific integrated circuit (ASIC), another chipset, a logic circuit, a register, a communication modem, and a data processing device, and the like, known in the art to execute various control logics disclosed below. In addition, when the control logic is implemented in software, the processor may be implemented as a set of program modules. At this time, the program module may be stored in a memory and executed by the processor. The memory may be provided in or out of the processor, and may be connected to the processor by various well-known means.

Referring to FIG. 1, the apparatus 100 for diagnosing a state of a battery according to an embodiment of the present disclosure may further include a storage unit 160.

Here, the storage unit 160 may store programs, data and the like required for diagnosing a state of a battery according to the present disclosure. That is, the storage unit 160 may store data necessary for operation and function of each component of the apparatus 100 for diagnosing a state of a battery, data generated in the process of performing the operation or function, or the like. The storage unit 160 is not particularly limited in its kind as long as it is a known information storage means that can record, erase, update and read data. As an example, the information storage means may include RAM, flash memory, ROM, EEPROM, registers, and the like. In addition, the storage unit 160 may store program codes in which processes executable by the apparatus 100 for diagnosing a state of a battery are defined.

For example, the storage unit 160 may store the classification history for the plurality of batteries. In addition, the storage unit 160 may store the plurality of battery profiles and the plurality of feature values, thereby storing various information about the plurality of batteries.

That is, according to the apparatus 100 for diagnosing a state of a battery, the state change of each of the plurality of batteries may be traced and diagnosed. Accordingly, when an accident occurs at the corresponding battery, the cause of the accident may be analyzed in various aspects based on various information about the corresponding battery stored in the storage unit 160.

Hereinafter, the content in which the battery classifying unit 140 classifies the plurality of batteries and the reference cell into any one of the plurality of groups based on the target component will be described in detail.

The battery classifying unit 140 may be configured to generate a representative model for classifying the plurality of batteries and the reference cell into any one of the plurality of groups, at every cycle.

Specifically, the battery classifying unit 140 may be configured to generate a target set including the selected at least one target component.

For example, it is assumed that the criterion value is set to 90% in the embodiment of FIG. 3. Since the sum of the distribution degree (55%) of the first principal component PC1 (55%), the distribution degree (25%) of the second principal component PC2, and the distribution degree (11%) of the third principal component PC3 is 91%, the first principal component PC1, the second principal component PC2, and third principal component PC3 may be selected as target components. In addition, the first principal component PC1, the second principal component PC2, and the third principal component PC3 selected as above may be configured to form a target set.

In addition, the battery classifying unit 140 may be configured to generate a plurality of target subsets including at least one target component among the generated target sets.

In the above embodiment, the battery classifying unit 140 may generate a plurality of target subsets by selecting at least one of the first principal component PC1, the second principal component PC2, and the third principal component PC3 included in the target set.

For example, if described according to the notation method of the tabular form, the target set is {the first principal component PC1, the second principal component PC2, the third principal component PC3}. The plurality of target subsets may be {the first principal component PC1}, {the second principal component PC2}, {the third principal component PC3}, {the first principal component PC1, the second principal component PC2}, {the first principal component PC1, the third principal component PC3}, {the second principal component PC2, the third principal component PC3}, and {the first principal component PC1, the second principal component PC2, the third principal component PC3}. Here, since the plurality of batteries are classified by the target component, it should be noted that empty sets are excluded from the target subset. Therefore, the number of target subsets generated by the battery classifying unit 140 is $2^n-1$, where n is the total number of target components. That is, in the above embodiment, since there are 3 target components, the number of target subsets is 7 according to the formula of "$2^3-1$".

The battery classifying unit 140 may be configured to generate at least one classification model for classifying the plurality of batteries and the reference cell for each of the plurality of target subsets.

Specifically, the battery classifying unit 140 may generate at least one classification model for one target subset. In addition, the number of classification models generated for each target subset may be independent for each target subset. That is, one classification model may be generated for a certain target subset, and 10 classification models may be generated for another target subset.

Figure 5:
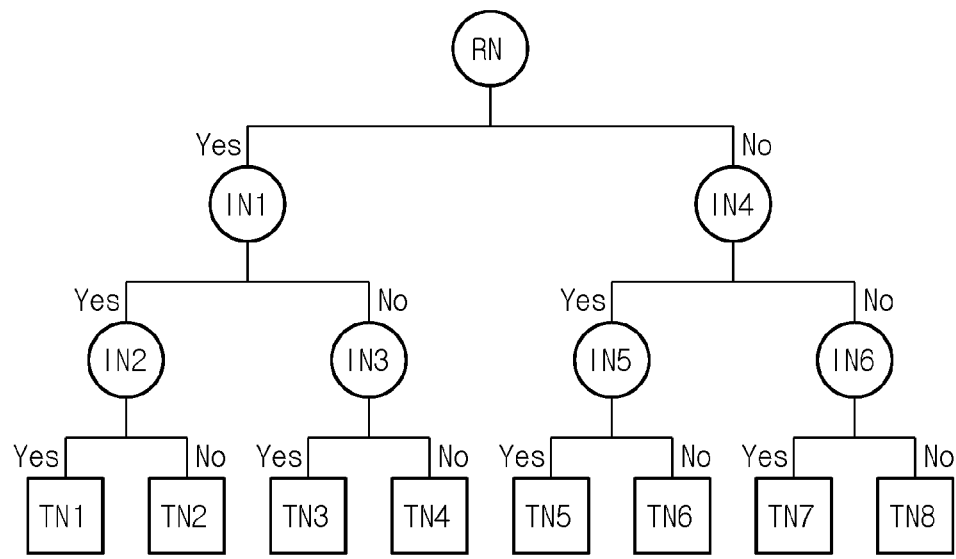

FIGS. 4 and 5 are diagrams schematically showing a classification model generated at a current cycle by the apparatus 100 for diagnosing a state of a battery according to an embodiment of the present disclosure.

Specifically, the classification models shown in FIGS. 4 and 5 are generated in a current cycle and may be different classification models randomly generated for one target subset.

For example, referring to FIGS. 4 and 5, the classification model generated by the battery classifying unit 140 may be a decision tree. That is, the classification model includes a root node RN, an internal node IN, and a terminal node TN. The root node RN and the internal node IN may include a classification condition for classifying the plurality of batteries, and the terminal node may include information about the classified batteries. Each terminal node may correspond to a group into which batteries may be classified. However, some of the plurality of terminal nodes may be blank nodes into which batteries are not classified.

For example, in the embodiment of FIG. 4, it is assumed that the reference cell is classified into the first terminal node TN1. The battery state diagnosing unit 150 may diagnose the state of the battery classified into the first terminal node TN1 among the plurality of batteries as an abnormal state.

As another example, in the embodiment of FIG. 4, it is assumed that the first reference cell in which the positive electrode reaction area is lost is classified into the first terminal node TN1, and the second reference cell in which the available lithium is lost is classified into the fourth terminal node TN4. The battery state diagnosing unit 150 may diagnose the state of the battery classified into the first terminal node TN1 among the plurality of batteries as an abnormal state due to the loss of the positive electrode reaction area, and diagnose the state of the battery classified into the fourth terminal node TN4 as an abnormal state due to the loss of available lithium.

In addition, in the embodiment of FIGS. 4 and 5, the classification condition included in the root node RN and the internal node IN may be arbitrarily generated by the battery classifying unit 140. For example, the root node RN of the classification model of FIG. 4 may include a classification condition associated with the first principal component PC1, and the root node RN of the classification model of FIG. 5 may include a classification condition associated with the third principal component PC3. Therefore, classification models generated for the same target subset may be different. Specific details of the classification conditions included in the root node RN and the internal node IN will be described later.

The battery classifying unit 140 may be configured to set any one of the plurality of classification models generated for the plurality of target subsets as a representative model for the corresponding cycle.

Specifically, the battery classifying unit 140 may be configured to calculate a classification degree of the plurality of batteries and the reference cell for each of the plurality of generated classification models.

The battery classifying unit 140 may calculate a classification degree for each classification model by using Equation 2 below. Here, the classification degree of the classification model is an index indicating the classification performance for the classification model. That is, the classification degree of the classification model may be an index indicating how well the classification model classifies the plurality of batteries and the reference cell. For example, the classification degree of the classification model may be Gini impurity.

$$GI(n) = 1 - \sum_{i=1}^{m} Pi^2 \qquad \text{[Equation 2]}$$

Here, GI(n) is a classification degree of a classification model, and n is a temporary variable for indicating each of a plurality of classification models generated for one target subset. In addition, i is a temporary variable for indicating a terminal node, and m is the number of terminal nodes included in the classification model. In addition, Pi is a ratio of the number of batteries and/or reference cells classified into the $i^{th}$ terminal node to the total number of the plurality of batteries and reference cells.

For example, the classification degree of the classification model of FIG. 4 may be calculated according to the formula of "$1-(P1^2+P2^2+P3^2+P4^2+P5^2+P6^2)$", and the classification degree of the classification model of FIG. 5 may be calculated according to the formula of "$1-(P1^2+P2^2+P3^2+P4^2+P5^2+P6^2+P7^2+P8^2)$".

As a specific example, it is assumed that the plurality of batteries are five batteries and there is 1 reference cell. That is, m of Equation 2 may be 6. In addition, it is assumed that the reference cell is classified into the first terminal node TN1 in the classification model of FIG. 4, and one battery is classified into each of the second to sixth terminal nodes TN2, TN3, TN4, TN5, TN6. The total number of the plurality of batteries and reference cell is 6, and the number of batteries and/or reference cell classified into each of the first to sixth terminal nodes TN1, TN2, TN3, TN4, TN5, TN6 is 1. In the embodiment of FIG. 4, all of P1 to P6 may be "1÷6". Accordingly, the classification degree of the classification model of FIG. 4 may be "5÷6" calculated according to the equation of "$1-\{(1\div6)^2\times6\}$".

As another example, it is assumed that the reference cell is classified into the first terminal node TN1 in the classification model of FIG. 5, and one battery is classified into each of the third to seventh terminal nodes TN3, TN4, TN5, TN6, TN7. In the embodiment of FIG. 5, all of P1 and P3 to P7 may be "1÷6". In addition, P2 and P8 may be "0" because there is no classified battery and/or reference cell. Accordingly, the classification degree of the classification model of FIG. 5 may be "5÷6" calculated according to the equation of "$1-\{(1\div6)^2\times6\}$".

In addition, the battery classifying unit 140 may be configured to set a classification model having a lowest calculated classification degree among the plurality of generated classification models as the representative model for the corresponding cycle.

According to Equation 2, as the calculated classification degree is lower, it may be determined that the classification model evenly classifies the plurality of batteries and the reference cell. Accordingly, the battery classifying unit 140 may set a classification model having a lowest calculated classification degree among the plurality of classification models generated for the plurality of target subsets as a representative model of the corresponding cycle.

For example, in the $n^{th}$ cycle, it is assumed that a p number of target subsets are generated and a q number of classification models are generated for each target subset. That is, a total of a p×q number of classification models may be generated in the $n^{th}$ cycle. The battery classifying unit 140 may calculate a classification degree for each of the p×q number of classification models, and set any one classification model having the lowest calculated classification degree as a representative model of the $n^{th}$ cycle.

If there are a plurality of classification models having the lowest calculated classification degree among the p×q number of classification models, the battery classifying unit 140 may set a classification model in which the number of non-blank terminal nodes is largest as a representative model among the plurality of classification models with the lowest calculated classification degree. In other words, the battery classifying unit 140 may set a classification model in which the number of terminal nodes into which the battery and/or reference cell are classified is largest as a representative model among the plurality of classification models having the lowest calculated classification degree.

That is, although the classification degrees calculated based on Equation 2 are the same, it may be determined that the plurality of batteries and the reference cell are evenly classified as the number of non-blank terminal nodes decreases. Therefore, the battery classifying unit 140 may set a representative model in consideration of the number of non-blank terminal nodes as well as the classification degree of the plurality of classification models.

If the calculated classification degree is lowest and there are a plurality of classification models having the same number of non-blank terminals, the battery classifying unit 140 may arbitrarily select any one among the plurality of classification models and set it as a representative model.

For example, referring to the previous embodiment, the classification degree of the classification model of FIGS. 4 and 5 is "5÷6". In addition, the number of non-blank terminal nodes TN1, TN2, TN3, TN4, TN5, TN6 in the classification model of FIG. 4 is 6. In addition, the number of non-blank terminal nodes TN1, TN3, TN4, TN5, TN6, TN7 in the classification model of FIG. 5 is 6. Accordingly, the battery classifying unit 140 may set the classification model of FIG. 4 or the classification model of FIG. 5 as a representative model of the current cycle.

In addition, the battery state diagnosing unit 150 may diagnose the state of the battery classified into the same group as the reference cell as an abnormal state, based on the representative model set by the battery classifying unit 140.

That is, the apparatus 100 for diagnosing a state of a battery according to an embodiment of the present disclosure may generate a plurality of classification models in one cycle, and set a representative model by comparing the classification degree between the plurality of generated classification models. In addition, since the state of the battery may be diagnosed according to the set representative model, the apparatus 100 for diagnosing a state of a battery may statistically diagnose the state of the battery more accurately, compared to the prior art in which the state of the battery is diagnosed by simply comparing battery information.

Hereinafter, classification conditions included in the root node RN and the internal node IN will be described in detail.

The battery classifying unit 140 may be configured to calculate an inner product of the plurality of batteries and the reference cell for at least one target component included in each of the plurality of target subsets.

Here, the target component may be a unique vector for the plurality of feature values extracted for the plurality of batteries. For each of these target components, the inner product of the battery for the target component may be obtained by calculating an inner product of the vector for the feature value of the battery.

For example, it is assumed that the target subset is {the first principal component PC1, the second principal component PC2}. In addition, it is assumed that the first battery, the second battery, and the reference cell are provided. For convenience of description, a starting point of the first principal component PC1 is called a point A, and a starting point of the second principal component PC2 is called a point B.

First, the battery classifying unit 140 may calculate the inner product of the first battery, the inner product of the second battery, and the inner product of the reference cell for the first principal component PC1.

Specifically, the battery classifying unit 140 calculates a first temporary vector, in which the starting point is the point A and the ending point is a point where the feature value of the first battery is located. In addition, the battery classifying unit 140 may calculate the inner product between the first principal component PC1 and the first temporary vector to calculate the inner product of the first battery for the first principal component PC1.

Similarly, the battery classifying unit 140 calculates a second temporary vector in which the starting point is the point A and the ending point is a point where the feature value of the second battery is located. In addition, the battery classifying unit 140 may calculate the inner product between the first principal component PC1 and the second temporary vector to calculate the inner product of the second battery for the first principal component PC1.

In the above manner, the battery classifying unit 140 may calculate the inner product of the reference cell for the first principal component PC1, the inner product of the first battery for the second principal component PC2, the inner product of the second battery for the second principal component PC2, and the inner product of the reference cell for the second principal component PC2.

In addition, the battery classifying unit 140 may be configured to generate the plurality of classification models for classifying the plurality of batteries and the reference cell according to the size of the plurality of calculated inner products.

Specifically, the battery classifying unit 140 may select one target subset for generating a classification model among the plurality of target subsets. In addition, the battery classifying unit 140 may arbitrarily select one of the target components belonging to the selected target subset.

In addition, the battery classifying unit 140 may classify the plurality of batteries and the reference cell based on a result of comparing the inner product of the plurality of batteries and the inner product of the reference cell for the selected target component with an arbitrarily set comparison value. Here, the arbitrarily set comparison value may be a value set by the battery classifying unit 140.

That is, a classification condition for comparing the size of the inner product of the plurality of batteries and the reference cell for the selected target component with the size of the arbitrarily set comparison value may be included in the root node RN or the internal node IN of the classification model, and, the plurality of batteries and the reference cell may be classified according to the classification result.

Thereafter, the battery classifying unit 140 may arbitrarily select one of the target components belonging to the selected target subset and reclassify the plurality of batteries and the reference cell. That is, the target component selected by the battery classifying unit 140 may be overlapped. In addition, the arbitrarily set comparison value can be changed since it is an arbitrarily selected value.

For example, in the embodiment of FIG. 5, when the target subset is {the first principal component PC1, the second principal component PC2, the third principal component PC3}, the battery classifying unit 140 may arbitrarily select the first principal component PC1 among the first principal component PC1, the second principal component PC2, and the third principal component PC3 for the root node RN.

The battery classifying unit 140 may calculate the inner product of the plurality of batteries and the inner product of the reference cell for the first principal component PC1. In addition, the battery classifying unit 140 may arbitrarily generate and set a first comparison value for the first principal component PC1. The battery classifying unit 140 may classify the plurality of batteries and the reference cell in the root node RN according to the result of comparing the size of the inner product of the plurality of batteries and the reference cell for the first principal component PC1 with the size of the arbitrarily set comparison value.

Thereafter, the battery classifying unit 140 may arbitrarily select the first principal component PC1 from the target subset for the first internal node IN1 again. In addition, the battery classifying unit 140 may arbitrarily generate and set a second comparison value for the first principal component PC1. Here, the first comparison value and the second comparison value are randomly generated values, and may be independent values from each other. Preferably, the first comparison value and the second comparison value may be different from each other.

The battery classifying unit 140 may classify some batteries in the first internal node IN1 according to the result of comparing the size of the inner product of some battery (batteries and/or reference cell classified to the first internal node IN1 according to the result classified in the root node RN) for the first principal component PC1 with the size of the second comparison value.

In this way, in the embodiment of FIG. 5, the battery classifying unit 140 may generate a classification model including one root node RN, six internal nodes IN1, IN2, IN3, IN4, IN5, IN6, and eight terminal nodes TN1, TN2, TN3, TN4, TN5, TN6, TN7, TN8.

Preferably, the battery classifying unit 140 may be configured to control so that the total number of groups to be classified is less than or equal to a preset criterion number, for each of the plurality of classification models.

That is, the battery classifying unit 140 may control the number of terminal nodes included in the classification model to be less than or equal to the criterion number.

For example, if there is no restriction on the number of terminal nodes, the classification model may be extended until a plurality of batteries and a reference cell are classified into one group, respectively. In this case, there is a problem in that the system resource required to generate one classification model is excessively wasted.

Also, referring to Equation 2, if the plurality of batteries and the reference cell are classified into separate groups, respectively, the classification degrees of the plurality of classification models may all be the same. For example, in the plurality of classification models, if at most one battery or reference cell is included in each of the plurality of groups, since Pi of Equation 2 is 0 or "1÷(the number of the plurality of batteries+the number of reference cells)", the classification degrees of the plurality of classification models may be all the same.

In this case, since there is no battery classified into the same group as the reference cell, there may be derived a result that the state of the battery cannot be diagnosed as abnormal.

Therefore, since the apparatus 100 for diagnosing a state of a battery according to an embodiment of the present disclosure controls the total number of terminal nodes included in the classification model, that is, the total number of groups to be classified, to be less than or equal to a preset criterion number, it is possible to save system resources required for generating classification models and to accurately diagnose the state of the battery.

The apparatus 100 for diagnosing a state of a battery according to the present disclosure may be applied to a BMS (Battery Management System). That is, the BMS according to the present disclosure may include the above-described apparatus 100 for diagnosing a state of a battery. In this configuration, at least some of the components of the apparatus 100 for diagnosing a state of a battery may be implemented by supplementing or adding functions of the configuration included in a conventional BMS. For example, the profile generating unit 110, the feature value extracting unit 120, the principal component calculating unit 130, the battery classifying unit 140, and the battery state diagnosing unit 150 of the apparatus 100 for diagnosing a state of a battery may be implemented as components of the BMS.

In addition, the apparatus 100 for diagnosing a state of a battery according to the present disclosure may be provided to a battery pack. For example, the battery pack according to the present disclosure may include the apparatus 100 for diagnosing a state of a battery as described above, and at least one battery cell. In addition, the battery pack may further include electrical equipment (a relay, a fuse, etc.), a case, and the like.

Figure 6:
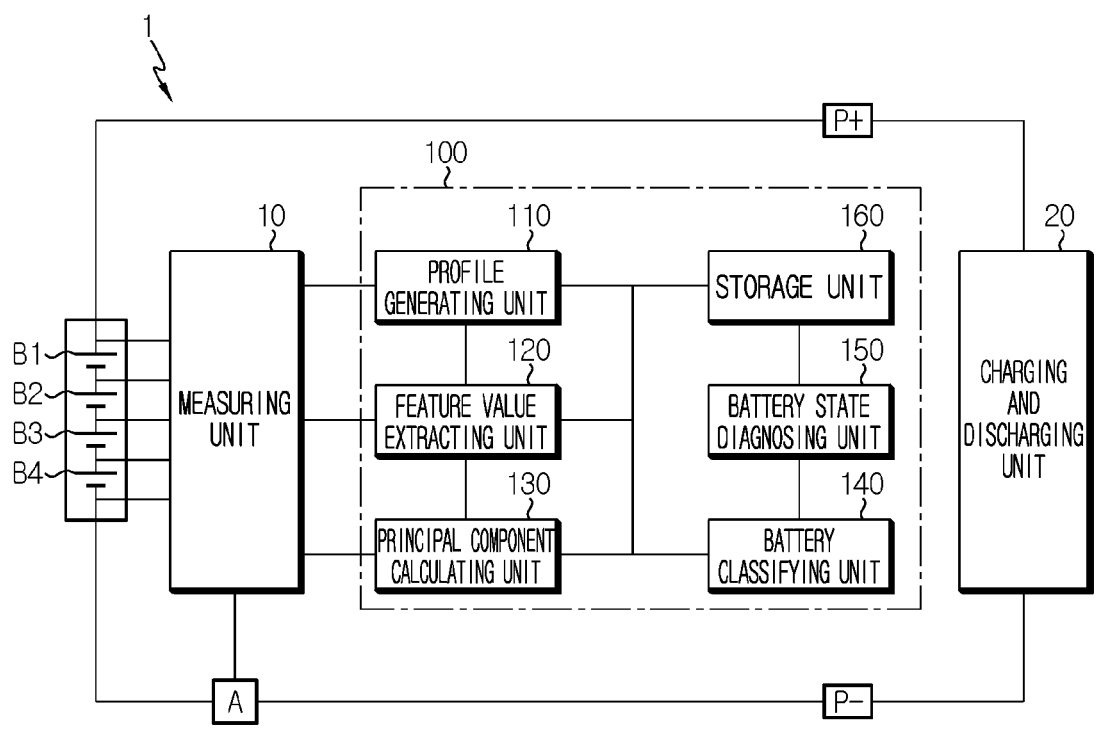
FIG. 6 is a diagram schematically showing an exemplary configuration of a battery pack including the apparatus for diagnosing a state of a battery according to an embodiment of the present disclosure.

FIG. 6 is a diagram schematically showing an exemplary configuration of a battery pack 1 including the apparatus 100 for diagnosing a state of a battery according to an embodiment of the present disclosure.

For example, referring to FIG. 6, the battery pack 1 may include a plurality of batteries B1, B2, B3, B4, a measuring unit 10, a charging and discharging unit 20, and the apparatus 100 for diagnosing a state of a battery. The charging and discharging unit 20 may charge the plurality of batteries. In addition, the measuring unit 10 may measure the voltage and current of each of the plurality of batteries while the plurality of batteries are being charged. In addition, the measuring unit 10 may measure the capacity of each of the plurality of batteries. Also, the measuring unit 10 may estimate the internal resistance, SOC, and SOH of each of the plurality of batteries. The profile generating unit 110 may receive battery information from the measuring unit 10 and generate a voltage-SOC profile, a voltage-capacity profile, a differential voltage profile, and a voltage-differential capacity profile based on the received battery information.

In addition, the apparatus 100 for diagnosing a state of a battery according to an embodiment of the present disclosure may be provided in an energy storage system. That is, the energy storage system according to the present disclosure may include the apparatus 100 for diagnosing a state of a battery.

For example, the apparatus 100 for diagnosing a state of a battery according to an embodiment of the present disclosure may be provided in the energy storage system to periodically diagnose the state of each battery included in the energy storage system. Therefore, even if a fire occurs in the energy storage system, the timing of the fire and the cause of the fire may be easily identified by utilizing the information stored by the apparatus 100 for diagnosing a state of a battery.

Figure 7:
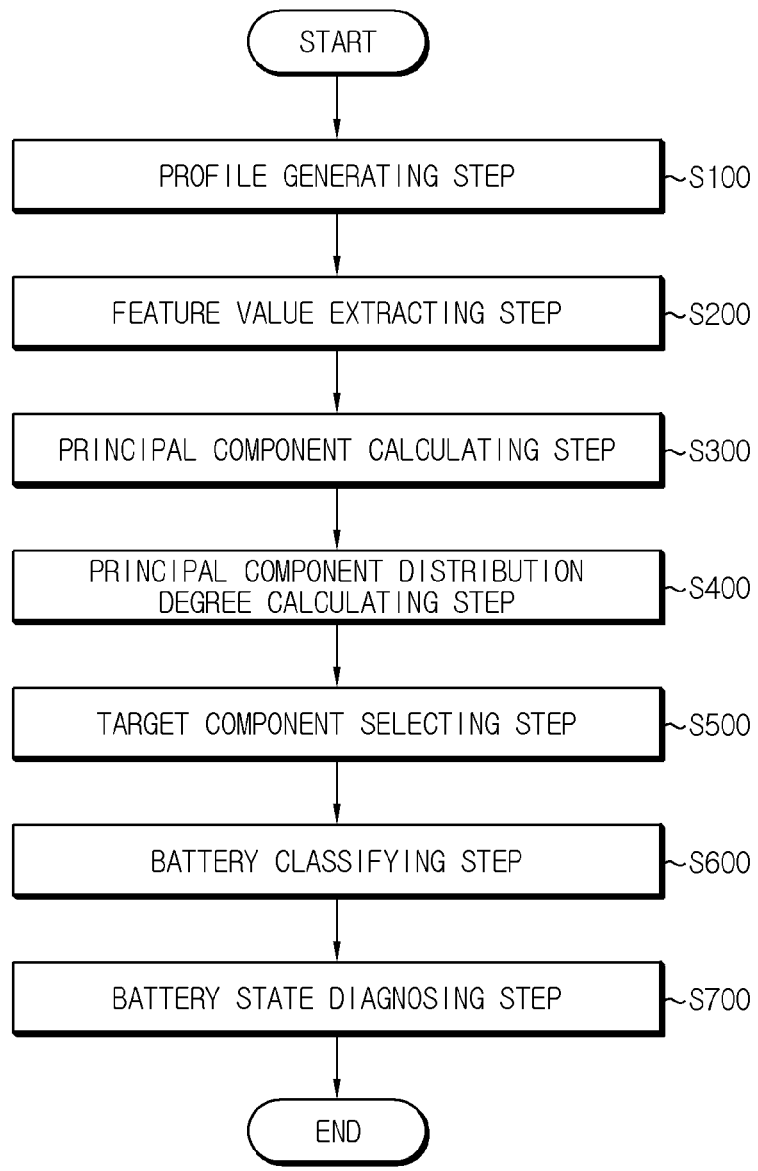
FIG. 7 is a diagram schematically showing a method for diagnosing a state of a battery according to another embodiment of the present disclosure.

FIG. 7 is a diagram schematically showing a method for diagnosing a state of a battery according to another embodiment of the present disclosure. Here, each step of the method for diagnosing a state of a battery may be performed by the apparatus 100 for diagnosing a state of a battery.

Hereinafter, content overlapping with the previously described content will be briefly described.

Referring to FIG. 7, the method for diagnosing a state of a battery may include a profile generating step (S100), a feature value extracting step (S200), a principal component calculating step (S300), a principal component distribution degree calculating step (S400), a target component selecting step (S500), a battery classifying step (S600), and a battery state diagnosing step (S700).

The profile generating step (S100) is a step of generating a battery profile representing a corresponding relationship between voltage and capacity of each of a plurality of batteries at every cycle for each of the plurality of batteries, and may be performed by the profile generating unit 110.

For example, in the profile generating step (S100), a voltage-SOC profile, a voltage-capacity profile, a differential voltage profile, and a voltage-differential capacity profile may be generated for each of the plurality of batteries.

The feature value extracting step (S200) is a step of extracting a plurality of feature values from each of the plurality of battery profiles generated in the profile generating step (S100), and may be performed by the feature value extracting unit 120.

The principal component calculating step (S300) is a step of calculating a plurality of principal components for the plurality of feature values extracted in the feature value extracting step (S200), and may be performed by the principal component calculating unit 130.

For example, the principal component calculating unit 130 may calculate the plurality of principal components according to the distribution of the plurality of feature values extracted for each of the plurality of batteries by using the principal component analysis method.

The principal component distribution degree calculating step (S400) is a step of calculating a distribution degree for each principal component representing the distribution of the plurality of batteries for the plurality of principal components based on the plurality of feature values extracted for each of the plurality of batteries, and may be performed by the battery classifying unit 140.

The target component selecting step (S500) is a step of selecting at least one of the plurality of principal components as a target component according to the result of comparing the distribution degree for each principal component calculated in the principal component distribution degree calculating step (S400) with a preset criterion value, and may be performed by the battery classifying unit 140.

For example, in the embodiment of FIG. 3, the criterion value may be preset to 90%. In addition, since the sum of the distribution degree (55%) of the first principal component PC1, the distribution degree (25%) of the second principal component PC2, and the distribution degree (11%) of the third principal component PC3 is equal to or greater than the criterion value (90%), the battery classifying unit 140 may select the first principal component PC1, the second principal component PC2, and the third principal component PC3 as a target component.

The battery classifying step (S600) is a step of classifying each of the plurality of batteries into any one of a plurality of groups based on the at least one target component selected in the target component selecting step (S500), and may be performed by the battery classifying unit 140.

The battery state diagnosing step (S700) is a step of updating the classification history for the group into which each of the plurality of batteries is classified in the battery classifying step (S600) at every cycle and diagnosing the state of each of the plurality of batteries based on the updated classification history, and may be performed by the battery state diagnosing unit 150.

For example, the battery state diagnosing unit 150 may determine a battery in which the group classified in a previous cycle and the group classified in a current cycle are different, as the target battery among the plurality of batteries. Thereafter, when the target battery is classified into an abnormal group in the current cycle, the battery state diagnosing unit 150 may be configured to diagnose the state of the target battery as an abnormal state if the changing frequency to the abnormal group is equal to or greater than a predetermined number. Conversely, when the target battery is classified into a normal group in the current cycle, the battery state diagnosing unit 150 may be configured to diagnose the state of the target battery as a normal state if the changing frequency to the normal group is equal to or greater than the predetermined number.

The embodiments of the present disclosure described above are not necessarily implemented by an apparatus and method but may also be implemented through a program for realizing functions corresponding to the configuration of the present disclosure or a recording medium on which the program is recorded. Such implementation may be easily performed by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

1: battery pack
10: measuring unit
20: charging and discharging unit
100: apparatus for diagnosing a state of a battery
110: profile generating unit
120: feature value extracting unit
130: principal component calculating unit
140: battery classifying unit
150: battery state diagnosing unit
160: storage unit

What is claimed is:

1. A battery system comprising:
a diagnosing apparatus comprising:
a profile generating unit configured to obtain battery information including at least one of voltage, capacity, internal resistance, state of charge (SOC), and state of health (SOH) of each of a plurality of batteries and generate a plurality of battery profiles based on the obtained battery information for each of the plurality of batteries at each of a plurality of cycles;
a feature value extracting unit configured to extract a plurality of feature values for each of the plurality of batteries by using the battery information and the plurality of battery profiles generated by the profile generating unit;
a principal component calculating unit configured to calculate a plurality of principal components for the plurality of feature values extracted by the feature value extracting unit;
a battery classifying unit configured to:
calculate a distribution degree for each principal component representing distribution of the plurality of batteries for the plurality of principal components based on the plurality of feature values extracted for each of the plurality of batteries,
select at least one of the plurality of principal components as a target component according to a result of comparing the calculated distribution degree for each principal component with a preset criterion value, and
classify each of the plurality of batteries into any one of a plurality of groups based on the selected at least one target component; and
a battery state diagnosing unit configured to update a classification history for a group into which each of the plurality of batteries is classified by the battery classifying unit at each of the plurality of cycles and diagnose a state of each of the plurality of batteries based on the updated classification history; and
a measuring unit configured to measure the battery information including the voltage of the plurality of batteries while the plurality of batteries are being charged or discharged and transmit the battery information to the profile generating unit.

2. The battery system according to claim 1,
wherein the battery classifying unit is configured to classify a reference cell set to correspond to an abnormal cell into any one of the plurality of groups based on the selected at least one target component, and
wherein the battery state diagnosing unit is configured to set a group to which the reference cell belongs among the plurality of groups as an abnormal group and set a remaining group as a normal group.

3. The battery system according to claim 2,
wherein the classification history is provided to each of the plurality of batteries and is configured to include a group classified in a previous cycle, a group classified in a current cycle, a changing frequency to the abnormal group, and a changing frequency to the normal group.

4. The battery system according to claim 3,
wherein the battery state diagnosing unit is configured to determine a target battery in which the group classified in the previous cycle is different from the group classified in the current cycle among the plurality of batteries, and diagnose the state of the target battery as a normal state or an abnormal state based on the changing frequency to the abnormal group or the changing frequency to the normal group for the determined target battery.

5. The battery system according to claim 4,
wherein the battery state diagnosing unit is configured to diagnose the state of the target battery as the abnormal state when the changing frequency to the abnormal group is equal to or greater than a predetermined frequency, in a case where the target battery is classified into the abnormal group at the current cycle, and
wherein the battery state diagnosing unit is configured to diagnose the state of the target battery as the normal state when the changing frequency to the normal group is equal to or greater than the predetermined frequency, in a case where the target battery is classified into the normal group at the current cycle.

6. The battery system according to claim 2,
wherein the battery classifying unit is configured to select at least one of the plurality of principal components, and select the selected at least one principal component as the target component when a sum of distribution degrees for each principal component corresponding to the selected at least one principal component is equal to or greater than the preset criterion value.

7. The battery system according to claim 6,
wherein the battery classifying unit is configured to calculate the sum by adding the distribution degree for each principal component corresponding to each of the plurality of principal components in order from a greater one, until the sum becomes equal to or greater than the preset criterion value.

8. The battery system according to claim 6,
wherein the battery classifying unit is configured to generate a representative model that classifies the plurality of batteries and the reference cell into the plurality of groups, at each of the plurality of cycles.

9. The battery system according to claim 8,
wherein the battery classifying unit is configured to generate a target set including the selected at least one target component, generate a plurality of target subsets including at least one target component in the generated target set, generate at least one classification model for classifying the plurality of batteries and the reference cell for each of the plurality of target subsets, and set any one of a plurality of classification models generated for the plurality of target subsets as a representative model for a corresponding cycle.

10. The battery system according to claim 9,
wherein the battery classifying unit is configured to calculate a classification degree of the plurality of batteries and the reference cell for each of the plurality of generated classification models, and set a classification model having a smallest calculated classification degree among the plurality of generated classification models as the representative model for the corresponding cycle.

11. The battery system according to claim 9,
wherein the battery classifying unit is configured to calculate an inner product of the plurality of batteries and the reference cell for at least one target component included in each of the plurality of target subsets, and generate the plurality of classification models for classifying the plurality of batteries and the reference cell according to a size of the plurality of calculated inner products.

12. The battery system according to claim 9,
wherein the battery classifying unit is configured to control each of the plurality of classification models so that a total number of classified groups is equal to or smaller than a preset criterion number.

13. A battery pack, comprising the battery system according to claim 1.

14. An energy storage system, comprising the battery system according to claim 1.

15. A diagnosing method, comprising:
a measuring battery information step including measuring battery information including a voltage of a plurality of batteries while the plurality of batteries are being charged or discharged;
a profile generating step of generating a battery profile representing a corresponding relationship between the voltage and capacity at each of a plurality of cycles for each of the plurality of batteries;
a feature value extracting step of extracting a plurality of feature values in each of the plurality of battery profiles generated in the profile generating step;
a principal component calculating step of calculating a plurality of principal components for the plurality of feature values extracted in the feature value extracting step;
a principal component distribution degree calculating step of calculating a distribution degree for each principal component representing distribution of the plurality of batteries for the plurality of principal components based on the plurality of feature values extracted for each of the plurality of batteries;
a target component selecting step of selecting at least one of the plurality of principal components as a target component according to a result of comparing the distribution degree for each principal component calculated in the principal component distribution degree calculating step with a preset criterion value;
a battery classifying step of classifying each of the plurality of batteries into any one of a plurality of groups based on the at least one target component selected in the target component selecting step; and
a battery state diagnosing step of updating a classification history for a group into which each of the plurality of batteries is classified in the battery classifying step at each of the plurality of cycles and diagnosing a state of each of the plurality of batteries based on the updated classification history.

16. The battery system according to claim 1, further comprising a storage configured to store data relating to diagnosing the state of each of the plurality of batteries.

17. The battery system according to claim 1, wherein the battery state diagnosing unit includes a processor.

18. The battery system according to claim 1, wherein the updated classification history includes a group classified in a previous cycle and a group classified in a current cycle.

* * * * *